(12) United States Patent
Kumar

(10) Patent No.: US 8,117,279 B2
(45) Date of Patent: *Feb. 14, 2012

(54) SYSTEM AND METHOD FOR DETECTING CUSTOMER PREMISE EQUIPMENT BEHIND A ROUTER ON A DATA-OVER-CABLE SYSTEM

(75) Inventor: Suresh W. G. Kumar, Naperville, IL (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 851 days.

This patent is subject to a terminal disclaimer.

(21) Appl. No.: 11/869,120

(22) Filed: Oct. 9, 2007

(65) Prior Publication Data

US 2008/0025327 A1   Jan. 31, 2008

Related U.S. Application Data

(63) Continuation of application No. 10/302,662, filed on Nov. 22, 2002, now Pat. No. 7,290,046.

(51) Int. Cl.
*G06F 15/16* (2006.01)
(52) U.S. Cl. ........ 709/217; 709/223; 709/253; 725/111; 725/119
(58) Field of Classification Search .................. 709/223, 709/250; 725/111, 119
See application file for complete search history.

(56) References Cited

U.S. PATENT DOCUMENTS

| 5,708,654 | A | 1/1998 | Arndt et al. |
|---|---|---|---|
| 6,189,102 | B1 | 2/2001 | Beser |
| 6,292,838 | B1 | 9/2001 | Nelson |
| 6,314,525 | B1 | 11/2001 | Mahalingham et al. |
| 6,345,294 | B1 | 2/2002 | O'Toole et al. |
| 6,370,147 | B1 | 4/2002 | Beser |
| 6,651,092 | B1 | 11/2003 | Muraoka |
| 6,697,862 | B1 * | 2/2004 | Beser et al. ............ 709/226 |
| 6,779,030 | B1 * | 8/2004 | Dugan et al. ............ 709/223 |
| 6,938,079 | B1 | 8/2005 | Anderson et al. |
| 7,290,046 | B1 | 10/2007 | Kumar |
| 2001/0012297 | A1 | 8/2001 | Hrastar et al. |
| 2003/0189928 | A1 | 10/2003 | Xiong |

* cited by examiner

*Primary Examiner* — John Follansbee
*Assistant Examiner* — Glenford Madamba

(57) ABSTRACT

A system and method permits a network management agent executing on a customer premise equipment (CPE) component to determine whether a router is coupled between the CPE component and the cable modem through which the CPE component communicates with a data-over-cable network. The network management agent executing on the CPE component encapsulates the MAC address of the CPE component in a network management message that is sent to a server at the head end of the data-over-cable network. The head end compares the encapsulated MAC address with the MAC address of the device coupled to the cable modem that sent the network management message. If the MAC addresses are not the same, the server at the head end sets a router status element in the network management message response and sends it to the agent executing on the CPE component. The agent may then interrogate the router status element and determine whether a router is coupled between the CPE component on which it is executing and the cable modem through which it is coupled to the data-over-cable network.

16 Claims, 7 Drawing Sheets

```
<?xml version ="1.0"?>
<magcrequest1.0>
<magcheader>
    <sourceid>ATTSA</sourceid>
    <timestamp>10/11/02 17:08:00</timestamp>
    <magcversion>1.0</magcversion>                } 130
    <opsys>Win 32</opsys>
    <user>not-set</user>
</magcheader>
<body>
    <magc-to-sas.acctqueryreq>
        <cpe_MAC_address>
            00-B0-D0-42-BF-03           } 132
        <cpe_MAC_address>
    </magc-to-sas.acctqueryreq>
</body>
</magcrequest1.0>
```

FIG. 7A

```
<?xml version ="1.0"?>
<magcresponse1.0>
<magcheader>
    <sourceid>SAS</sourceid>
    <timestamp>10/11/02 17:35:00</timestamp>   } 134
    <magcversion>1.0</magcversion>
</magcheader>
                                        136
<body>
    <sas-to-magc.acctqueryresp   cpe_behind_router_status=1>
        <status>success</status>
        <datastatus>active</datastatus>
        <ispstatusblock>
            <ispcode>JUNO</ispcode>
            <ispstatus>active</ispstatus>
        </ispstatusblock>
    </sas-to-magc.acctqueryresp
</body>
</magcresponse1.0>
```

FIG. 7B

SYSTEM AND METHOD FOR DETECTING CUSTOMER PREMISE EQUIPMENT BEHIND A ROUTER ON A DATA-OVER-CABLE SYSTEM

This application is a continuation of U.S. Pat. application Ser. No. 10/302,662, filed Nov. 22, 2002, entitled System and Method For Detecting Customer Premise Equipment Behind a Router on a Data-Over-Cable system, now U.S. Pat. No. 7,290,046 B1. The aforementioned related patent application is herein incorporated by reference.

FIELD OF THE INVENTION

This invention relates generally to data-over-cable systems and, more particularly, to the Internet Protocol (IP) management of Customer Premise Equipment (CPE) by the Cable Modem Termination System (CMTS) of a Multiple Service Operator (MSO) in data-over-cable systems.

BACKGROUND OF THE INVENTION

One of the earliest methods of accessing services available over the Internet was through subscription service provided by an Internet Service Provider (ISP). Most subscribers were individuals who owned personal computers. After obtaining a subscription with an ISP, they would install ISP access software on their computers. This software would use a modem, either internal or external to a computer, to dial an access number for the ISP and establish a communication link with an ISP server through the Public Switched Telephone Network (PSTN). The ISP server could then communicate data messages between the subscriber's computer and other computers coupled to the ISP server through the Internet backbone. These messages were principally used to download files, typically in the Hypertext Markup Language (HTML) format, to the subscribers. Most subscribers executed an application program on their computers called a browser that displayed the content of the downloaded files for the subscriber.

Content from the other computers coupled to the ISP server became significantly larger as image data files and program files, such as applets and the like, were included in the downloaded files. The telephone connection through the modem to the PSTN was typically a twisted pair connection that had a significantly limited bandwidth. Because this limitation was a physical characteristic of the twisted pair conductors used to provide telephone service to most homes, companies began to investigate the availability of other communication media capable of broad bandwidth communication that could be used to couple subscribers to an Internet access service provider.

One candidate for broad bandwidth Internet service is Cable Television (CATV) system architecture. These systems typically include coaxial cable service to subscriber homes and, in some systems, fiber optic cable may form a backbone for the system. Systems that use both coaxial cable and fiber optic cable to provide service to subscribers are called hybrid fiber cable (HFC) systems. These coaxial and fiber optic cables may support broad bandwidth communications but the data messages in this type of system are uni-directional rather than bi-directional as required for Internet communication. To address these limitations, companies began to develop cable modems for receiving Transport Control Protocol/Internet Protocol (TCP/IP) messages from a computer at a subscriber site and translating them for delivery to the head end of the CATV system and vice versa. While a communication channel could be provided for downstream messages from the head end to a subscriber through the same equipment that provided cable programming content to subscribers, communication to the head end from the subscribers was more problematic. One way of addressing the limited ability to route communication from the subscribers to the head end was to have the cable modems direct communication for the head end to a Telephony Remote Access Concentrator (TRAC) through the PSTN. As routers were developed for bi-directional message traffic through a CATV system, CATV systems capable of supporting broad bandwidth data communication without PSTN support for upstream communication became available.

At the head end of a CATV system, a Cable Modem Termination System (CMTS) manages the communication network aspects of a CATV system. The CMTS may receive data messages from computers at subscriber sites or the messages may be received by a TRAC that communicates with the CMTS for downstream communication with the subscribers. The TRAC or the CMTS, or both, may communicate with other computers on the Internet to obtain the content requested by computers at the subscriber sites and then deliver that content to the subscriber sites through the CMTS.

In order to establish communication between the CMTS at the head end of a CATV system and computers at the subscriber sites, the communication standards for the network formed by the CMTS, CATV system, and cable modems needed to be defined. One specification developed for this type of network is the Data-Over-Cable Service Interface Specification (DOCSIS). This specification provides the requirements that cable modems need to implement in order to support data communication over CATV systems and be compatible with the CMTS and TRAC component, if provided, in such systems.

One requirement identified by this specification is the need for the CMTS to recognize the cable modem at each subscriber site through which the computers at the subscriber site communicate with the CMTS. This recognition is provided through the Dynamic Host Configuration Protocol (DHCP). DHCP is known from TCP/IP networks. DHCP allows a device to be installed on a network and obtain an IP address on the network so messages from and to the device may be identified. Under DOCSIS, a cable modem is identified by its Media Access Control (MAC) address. This address is a 48-bit value that is stored in a network interface card (NIC) at the time of its manufacture. A cable modem communicates with the CMTS through a NIC having a MAC address and this address is provided to a DHCP server. Through the process managed by a DHCP server located at the head end and coupled to the CATV system through the CMTS, a routing table and Address Resolution Protocol (ARP) table are generated at the CMTS that correlates each MAC address of the cable modems on the system with a unique IP address. Also, the DHCP server provides a pointer to a Trivial File Transfer Protocol (TFTP) server so the cable modem may download a configuration file from the TFTP server to establish the modem's configuration mode and parameters. Likewise, the cable modem generates a routing table and ARP table for identifying the IP address and MAC address of the CMTS.

When a subscriber couples a computer to a cable modem, the computer requires an IP address for communication with the CMTS under DOCSIS. The CPE component communicates with the DHCP server through the cable modem and CMTS so the DHCP server may assign an IP address to the subscriber's computer. Equipment coupled to the CATV system through a cable modem is known as Customer Premises Equipment (CPE). A NIC within a CPE component is coupled to a NIC at the cable modem other than its CATV NIC. The CATV NIC is the NIC through which the modem is coupled to the CATV network. The cable modem relaying the DHCP messages from the DHCP agent software executing on the CPE provides the DHCP server with the CATV NIC MAC address and the MAC address of the CPE NIC. The DHCP server uses the MAC addresses to assign an IP address to the CPE device coupled through the cable modem and to provide a TFTP server pointer through the DHCP server at the head end. The CMTS uses the two MAC addresses and assigned IP address to update its routing and ARP tables. Also, the cable modem maintains a routing table and ARP table that correlate the MAC address of the CPE NIC with the IP address assigned to the CPE coupled through the network interface.

The DOCSIS specification assumes that each CPE coupled to the CATV system through the cable modem is coupled through a separate NIC at the cable modem. However, many subscribers have more than one computer at a site and may desire to couple more than one computer at the site to the CATV system at the same time. In order to make contemporaneous operation of two computers through the cable modem possible, each would require a separate connection to the cable modem. This may require a hub or physical proximity of the two or more computers to the cable modem. In an effort to avoid such a constraint, some subscribers install a router, such as a wireless router, to couple all of the computers at their site together into a network. The router may then be coupled to the cable modem so all of the computers and other devices coupled together on the network are coupled through the router to the cable modem and the data-over-cable system supported on the CATV system.

When the router is initialized after being coupled to the cable modem, it is assigned an IP address by the DHCP server. When one of the computers coupled to the subscriber site router initiates an Internet session through the CMTS, the computer must be assigned an IP address and configured for communication over the CATV system. The agent software that manages the IP communication parameters for the computer does not know that it is coupled to the CATV network through a router. When the agent sends a message to a Service Activation Service (SAS) server at the CMTS requesting access account information for the CPE component on which it is executing, the MAC address of the CPE component does not get past the router to the cable modem. Consequently, the SAS server treats the message as coming from the router. Messages received at the router for the CPE component are still passed through to the CPE component because the router recognizes the IP address for the CPE component from its internal routing table. Also, the CMTS views the topology of the computers coupled to it through a cable modem as only being no more than one node behind the cable modem because the modem only supplies its MAC address and the MAC address of the router to the CMTS. This limitation raises a number of issues for communication over a DOCSIS network.

For one, configuration management may be affected. Configuration management of nodes on a network includes initializing, maintaining, adding, and updating network components. Typically, this includes modifying parameters for physical resources and/or logical objects. Configuration actions may be classified as non-operational or operational actions. Non-operational actions are those parameter modifications that do not alter the operating environment. For example, a change regarding contact information that identifies the person responsible for CMTS operation is non-operational. Operational actions, on the other hand, do alter the operating environment.

One example of an operational action occurs when a subscriber activates an account with a Cable Access Provider. Prior to account registration/activation, the cable modem, router, and CPE component at a subscriber site only have private IP addresses. A private IP address permits a subscriber to access services directly provided from the head end but it does not allow access to services from the Internet or other external service. In order to access the Internet, the subscriber must activate the high speed data service. Agent software on the CPE component is responsible for obtaining the user's account information, authenticating the user with the SAS server at the head end, and navigating to the SAS server activation page. At the end of a successful registration/activation, the SAS server sends a MIME message response for the agent software that indicates the completion of the activation/registration.

At this point, the user has established an account and a service level for the account. The agent software then sends an account query message to the SAS server to determine whether device management is required for utilization of the account. If a cable modem reboot is required, the SAS server responds with a response message indicating the cable modem needs to be reset for account utilization. After processing the response message, the agent software on the CPE component displays a message informing the user that the cable modem needs to reboot in order for Internet access to become available. This is typically required as the cable modem may also provide access to other services and the rebooting of the cable modem may disrupt other active services. If the user signals acceptance of a cable modem reboot, the agent software sends a Cable Modem Reset XML message to the SAS server, which in turn issues a cable modem reboot to the cable modem. In response, the cable modem goes through the process for obtaining a routable IP address and being configured for the level of service to which the subscriber agreed.

At this point, only the cable modem has a routable IP address. If the CPE component is directly coupled to the cable modem, then one way to obtain a routable address is for the CPE component to reboot in order to initiate the process for obtaining a routable IP address. This process is commonly known as the DHCP renew process. However, if the CPE component is coupled to the cable modem through a router, rebooting the CPE component is ineffective because the CPE component is assigned an IP address by the router and, until the router has a routable IP address, the CPE component cannot obtain a routable IP address to access the Internet through a high speed data service. To obtain a routable IP address, the router needs to be reset so it initiates the process for obtaining a routable IP address. However, the agent software does not have data indicating whether it is coupled directly to the cable modem or indirectly through a router to initiate the router to obtain a routable IP address.

This type of ambiguous condition occurs when a router at a subscriber site is replaced with another router. When the CPE component is rebooted after the router replacement, the agent software on the CPE component may send an account query message to the SAS server. The SAS server detects the router change from the change in MAC address between the previous router and the replacement router. The message response from the SAS server to the CPE component indicates that device management is required. After performing device management, the agent software knows that a DHCP renew message needs to be issued. However, the CPE agent software does not know whether the message is to be issued to the new router or to the CPE component.

What is needed is a way for the agent software executing on a CPE component to recognize that a router is coupled between the CPE component on which it is executing and the cable modem coupling the CPE component to a data-over-cable system.

What is needed is a way for the agent software executing on a CPE component to take an action with respect to a router to which it is coupled in response to a device management response directed to the CPE component.

What is needed is a way for the head end to distinguish a router at a site from the CPE components it couples to a data-over-cable network.

SUMMARY OF THE INVENTION

The above-noted limitations of previously known DOCSIS systems have been overcome by a system and method that operate in accordance with the principles of the present invention. The system of the present invention comprises a network management agent executing on a CPE component that encapsulates its MAC address in a network management message and a head end server that compares the encapsulated MAC address to a source MAC address corresponding to a device that relayed the network management message from the CPE component to the head end server. In response to the encapsulated MAC address being different than the source MAC address, the head end server may send a network management message response with a router status element that informs the CPE configuration management agent that it is executing on a CPE component that is behind a router. In response to the router status element, the CPE agent sets a router present element so it may evaluate a network management message and determine whether to perform a process or to take an action with respect to the operation of the router to which it is coupled.

For example, a CPE component reboot following a router replacement may result in the agent software sending an account query message, such as a Query Account Information XML message, to a head end server, such as a SAS server. The SAS server responds to the agent software with a response indicating that device management is required. After the agent software authenticates the user's stored credentials, the agent software navigates the user to the device management URL at the SAS server. When the device management process is finished, the SAS server sends to the agent software a MIME message response for the agent software that indicates the device management process is complete. At this point, the agent software does not know whether it should reboot the CPE component to initiate a DHCP renew process or to reset the router. The system of the present invention enables the agent software to encapsulate the CPE component MAC address in a network management message and send it to a head end server, such as the SAS server. The head end server parses the network management message from the CPE component and compares the encapsulated MAC address with the source MAC address of the network management message. In response to the two addresses being different, the head end server sets a router status element to an active state and sends a network management message response containing the router status element to the agent software. Upon receipt of the response, the agent software parses the response and determines that a router is coupled between the CPE component and the cable modem at the subscriber site. Consequently, the agent software displays a message to a user at the CPE component directing the user to reset the router. In response to the router being reset, the router commences a process for obtaining a routable IP address. Thus, the router may obtain a routable IP address so the CPE component may communicate on the data-over-cable network without unnecessarily altering the environment or operation of the CPE component.

The method of the present invention includes encapsulating a MAC address for a CPE component in a network management message and comparing the encapsulated MAC address to a source MAC address of the device that relayed the message to a cable modem to determine whether the CPE component is behind a router. In response to a determination that the encapsulated MAC address is different from the source MAC address, a router status element is set to an active state. The active router status element indicates the network management message originated from a CPE component that is coupled to a cable modem through an intervening device, such as a router. A network management message response containing the router status element is sent to the CPE component and the network management agent parses the network management message response. The agent may set a router present element in correspondence with the router status element in the network management message response. The agent may then determine whether its position behind the router permits it to ignore a network management message response or to take some action with respect to the router. For example, the agent, in response to a network management message response that was transmitted by a head end server upon detection of a new service level change or a router change, may display a message to the user at the CPE component directing the user to reset the router or otherwise alter the parameters controlling the router.

Encapsulation of the MAC address is performed by the network management agent software executing at the CPE component when the CPE component generates and sends a network management message requesting account information. Preferably, the network management agent is an account query message and, most preferably, it is a Query Account Information Extended Markup Language (XML) message. In response to detection of a router status element that indicates a router is coupled to the CPE component, the agent sets a router present element to an active state and typical network management message response processing is performed.

It is an object of the present invention to enable a server at the head end to determine whether a CPE component is behind a router at a subscriber's site.

It is an object of the present invention to enable a network management agent at a CPE component to determine that the CPE component is behind a router.

It is an object of the present invention to enable a network management agent at a CPE component to invoke an action with respect to a router that couples the CPE component to a data-over-cable system.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

FIG. 7A is a diagram of the elements in an exemplary network management message used to encapsulate the MAC address of a CPE component;

FIG. 7B is a diagram of the elements in an exemplary network management message response used to inform a network management agent that it is behind a router;

DETAILED DESCRIPTION OF THE INVENTION

Figure 1:
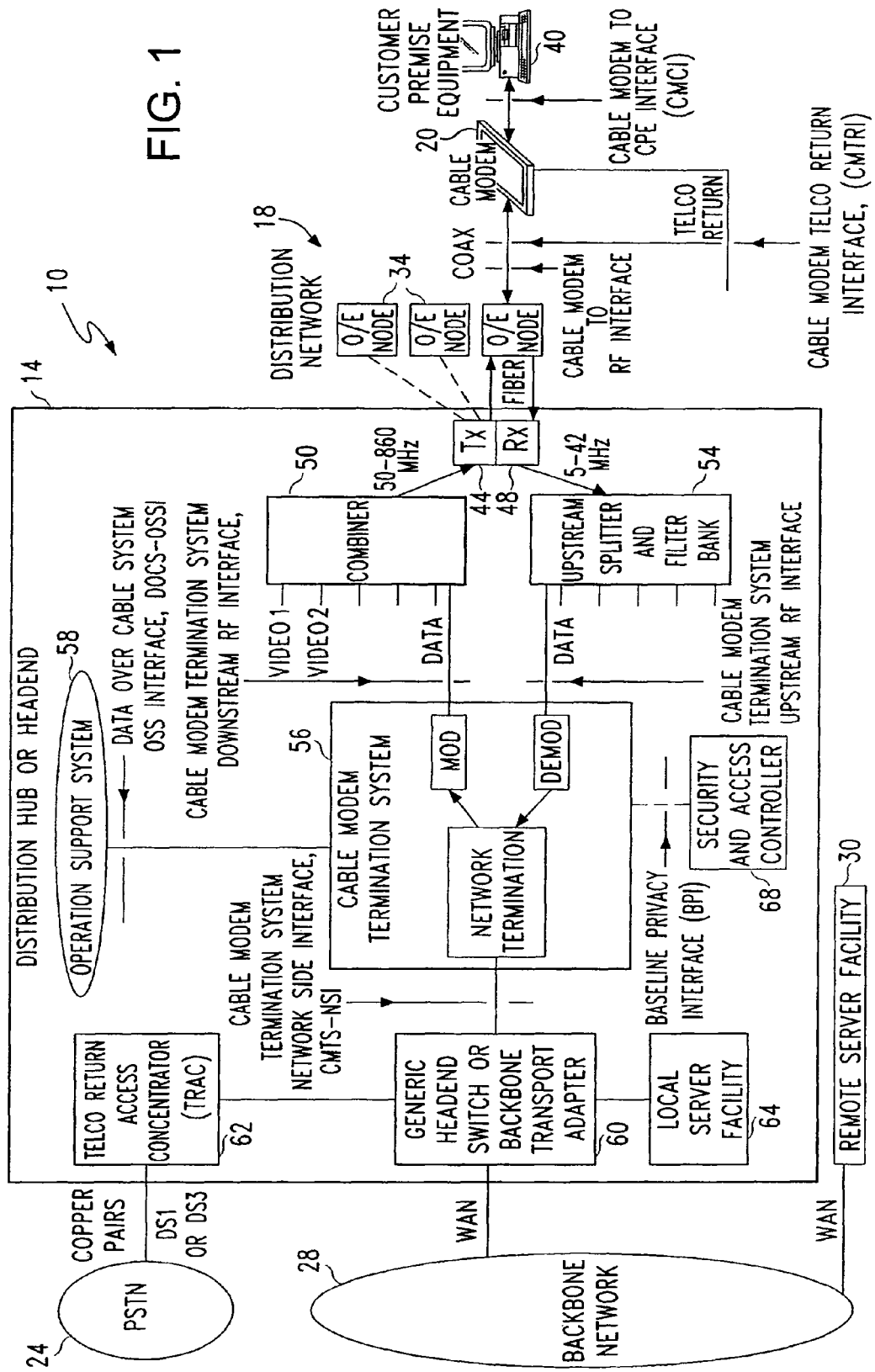
FIG. 1 is a diagram of a data-over-cable system coupled to a CPE component through a cable modem.

A data-over-cable system in which the system and method of the present invention may operate is shown in FIG. 1. System 10 includes a distribution hub or head end 14 that is coupled through a distribution network 18 to one or more cable modems 20. Head end 14 may be coupled to public switched telephone (PSTN) 24 and/or backbone network 28. Network 28 couples head end 14 to one or more remote server facilities 30. Backbone network 28 is coupled to head end 14 and remote server facility 30 through any known wide area network (WAN) configuration while copper wire pairs, DS1, or DS2 connections may be used to couple head end 14 to PSTN 24. Head end 14 may be coupled to nodes 34 of distribution network 18 by optical fiber or coaxial cable. Coaxial cable or optical cable may be used to couple nodes 34 to a cable modem 20 at a subscriber site, although most typically coaxial cable is used for such coupling.

A cable modem 20 at a subscriber site may be used to couple a customer premise equipment (CPE) component 40, such as a PC or the like, to head end 14 through distribution network 18. Cable modem 20 may be any known cable modem such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta of Norcross, Ga., and others. The system and method of the present invention are especially useful with cable modems implementing the DOCSIS 1.0, 1.1, or 2.0 specifications, although it may be implemented with other data-over-cable systems. Cable modem 20 receives downstream messages from a downstream channel that is typically in the 50 to 860 MHz range and each channel is typically located in a 5 MHz width band within that range. Cable modem 20 may transmit messages to head end 14 on an upstream channel in the 5 to 42 MHz range and, again, the channels are typically located in a 5 MHz width band within that range. Alternatively, cable modem 20 may communicate upstream messages to Telco Return Access Concentrator (TRAC) 62 at head end 14 through cable modem 20, a Telco Return Interface, and PSTN 24.

Cable modem 20 is coupled to a computer at the subscriber site as shown in FIG. 1. This coupling is typically performed using an Ethernet connection that supports IEEE 802.3 or DIX Ethernet, a USB connection, or a PCI connection. The data messages are typically implemented in TCP/IP, although other protocols may be used. Cable modem 20 includes one or more network interfaces for coupling CPE components to it. Each CPE component includes a network interface card (NIC) for communicating with cable modem 20 when connected as shown in FIG. 1. As noted above, the network interface between cable modem 20 and distribution network 18 and the NIC at CPE 40 each have a unique 48-bit MAC address that may be used to identify the device. Most typically, an application, such as an Internet browser executing in the application layer at the CPE, communicates requests for files to head end 14 through upstream communications and head end 14 sends the requests over backbone network 28 to a remote server facility 30 for the requested files. When the files are returned, head end 14 determines the destination address for the files and sends them through a downstream channel to cable modem 20 that forwards the files to computer 40 for display by the browser.

Head end 14 includes a transmitter 44, a receiver 48, a combiner 50, an upstream splitter 54, a Cable Modem Termination System (CMTS) 56, an operation support system (OSS) 58, and a head end switch or backbone transport adapter 60. Head end 14 may also include a Telephony Return Access Concentrator (TRAC) 62 if upstream communication is performed through PSTN 24. A local server facility 64 may also be provided if the Multiple Service Operator (MSO) responsible for operation of head end 14 provides locally available content for subscribers over the data-over-cable system. Head end 14 may also include a security and access controller system 68 to provide secure communications within the network. CMTS 56 terminates distribution network 18 and modulates downstream messages as input for combiner 50 that provides content for the various channels through transmitter 44 over distribution network 18 to cable modems 20 coupled to nodes 34 of distribution network 18. CMTS 56 demodulates messages that were received from CPE 40 and cable modem 20 through upstream splitter 54, receiver 48, and distribution network 18. Alternatively, upstream messages may be received by TRAC 62 and provided to CMTS 56 through switch 60. Also, responses from remote servers 30 received over network 28 are provided to CMTS 56 through switch 60. These responses are prepared for transmission over distribution network 18 by CMTS 56. Security and access controller 68 may be used to reduce the likelihood of fraudulent activity over network 18 and to limit access to the data-over-cable system to authorized users only.

OSS 58 may be used to perform basic network management control functions such as managing objects through management information bases (MIB) as well as account, configuration, fault, performance management, event notification, and filtering functions. On systems operating in accordance with the DOCSIS specification, these functions are implemented using the Simple Network Management Protocol (SNMP). To perform its tasks, OSS 58 includes various types of servers and proxies such as those required for DHCP processing. OSS 58 may include a Service Activation Server (not shown) that is used for the management of subscriber account activity over network 18 and this server, preferably, parses and responds to network management messages, such as account query messages, to inform a network management agent that it is executing on a CPE component that is behind a router.

The interface requirements between CMTS 56 and OSS 58 for a DOCSIS data-over-cable system are described in DOCSIS Operations Support System Interface Specification, SP-OSSIv2.0-I02-020617 available from Cable Television Laboratories, Inc. at http:\\www.cablemodem.com. The interface requirements between CMTS 56 and switch 60 in a DOCSIS data-over-cable system are described in DOCSIS Cable Modem Termination System-Network Side Interface Specification SP-CMTS-NSII01-960702 available from Cable Television Laboratories, Inc. at http:\\www.cablemodem.com. The interface requirements between CMTS 56 and controller 68 for a DOCSIS data-over-cable system are described in DOCSIS Baseline Privacy Interface Specification SP-BPI available from Cable Television Laboratories, Inc. at http:\\www.cablemodem.com. The interface requirements between CMTS 56 and the RF components for upstream/downstream communication in a DOCSIS data-over-cable system are described in DOCSIS Radio Frequency Interface Specification SP-RFIv2.0-I02-020617 available from Cable Television Laboratories, Inc. at http:\\www.cablemodem.com.

Figure 2:
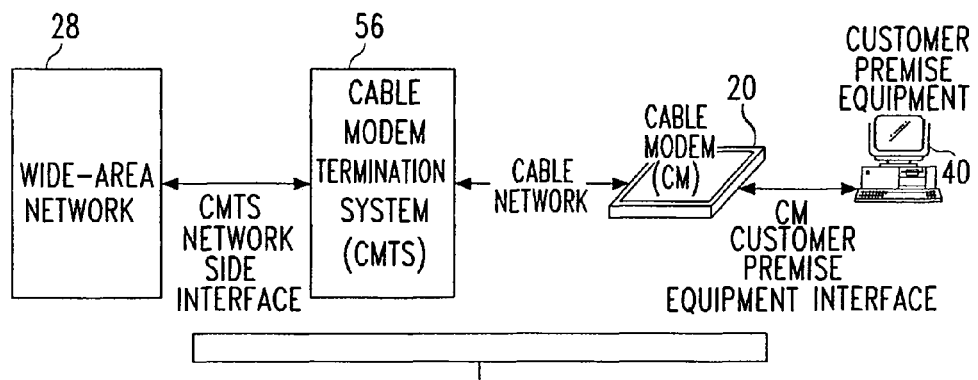
FIG. 2 is a diagram of IP message flow through the system of FIG. 1.

A diagram depicting the flow of IP message traffic in the system of FIG. 1 is shown in FIG. 2. The bi-directional IP traffic flow permits an application at a CPE component 40 to communicate requests for data and data forms to a remote server through a WAN 28 that is serviced by CMTS 56. In order to provide this IP message traffic flow, the devices communicating and routing communications through this system must be properly initialized, configured, and registered with head end 14. This initialization, configuration, and registration process is managed by OSS 58. One purpose for initializing, configuring, and registering devices on system 10 is to replace the private IP address for the devices communicating on the network with routable IP addresses so the subscribers may access external services. In order to assign IP addresses, the devices must provide their MAC addresses to head end 14 so routing tables and ARP tables may be built and updated.

The initialization, configuration, and registration processes may be controlled by OSS 58 using the Dynamic Host Configuration Protocol (DHCP), although other protocols and processes may be used to implement the principles of the present invention. DHCP is known from TCP/IP networks. Although the system is described with OSS using DHCP to initialize, configure, and register devices, other protocols may be used for implementing these processes. DHCP allows a device to be installed on a network and obtain an IP address on the network so messages from and to the device may be identified. As part of the initialization process, a cable modem may provide its 48-bit Media Access Control (MAC) address to a DHCP server of OSS 58. Through the process managed by a DHCP server located at head end 14 and coupled to distribution network 18 through CMTS 56, a routing table and Address Resolution Protocol (ARP) table are generated at CMTS 56 that correlates each MAC address of the cable modems 20 coupled to network 18 with a unique IP address. Also, the DHCP server provides a pointer to a Trivial File Transfer Protocol (TFTP) server so the cable modem may download a configuration file from a TFTP server of OSS 58 to establish the modem's configuration mode and parameters. Likewise, cable modem 20 generates a routing table and ARP table for identifying the IP address and MAC address of CTMS 56.

When a subscriber couples a CPE component 40 to a cable modem 20, component 40 requires an IP address for communication with CMTS 56 under DOCSIS. CPE component 40 communicates with a DHCP server through cable modem 20 and CMTS 56 so the DHCP server may assign an IP address to the subscriber's computer. A NIC within CPE component 40 is coupled to a NIC at cable modem 20 other than its CATV NIC. The CATV NIC is the NIC through which modem 20 is coupled to distribution network 18. Cable modem 20 relays the DHCP messages from the network management agent software executing on CPE component 40 to provide the DHCP server with the CATV NIC MAC address and the MAC address of the CPE NIC. The DHCP server uses the MAC addresses to assign an IP address to CPE component 40 coupled through cable modem 20. CMTS 56 uses the two MAC addresses and assigned IP address to update its routing and ARP tables. Also, cable modem 20 maintains a routing table and ARP table that correlate the MAC address of the CPE NIC with the IP address assigned to CPE component 40 coupled through the network interface.

Figure 4:
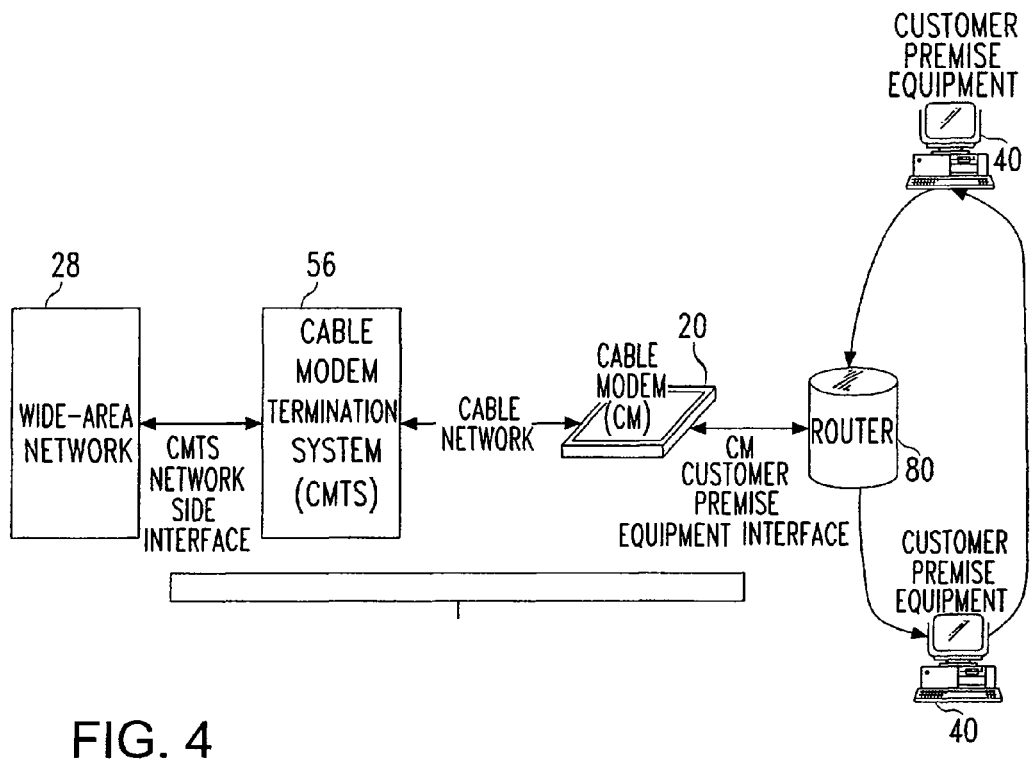
FIG. 4 is a diagram of IP message flow through the system of FIG. 3.
Figure 3:
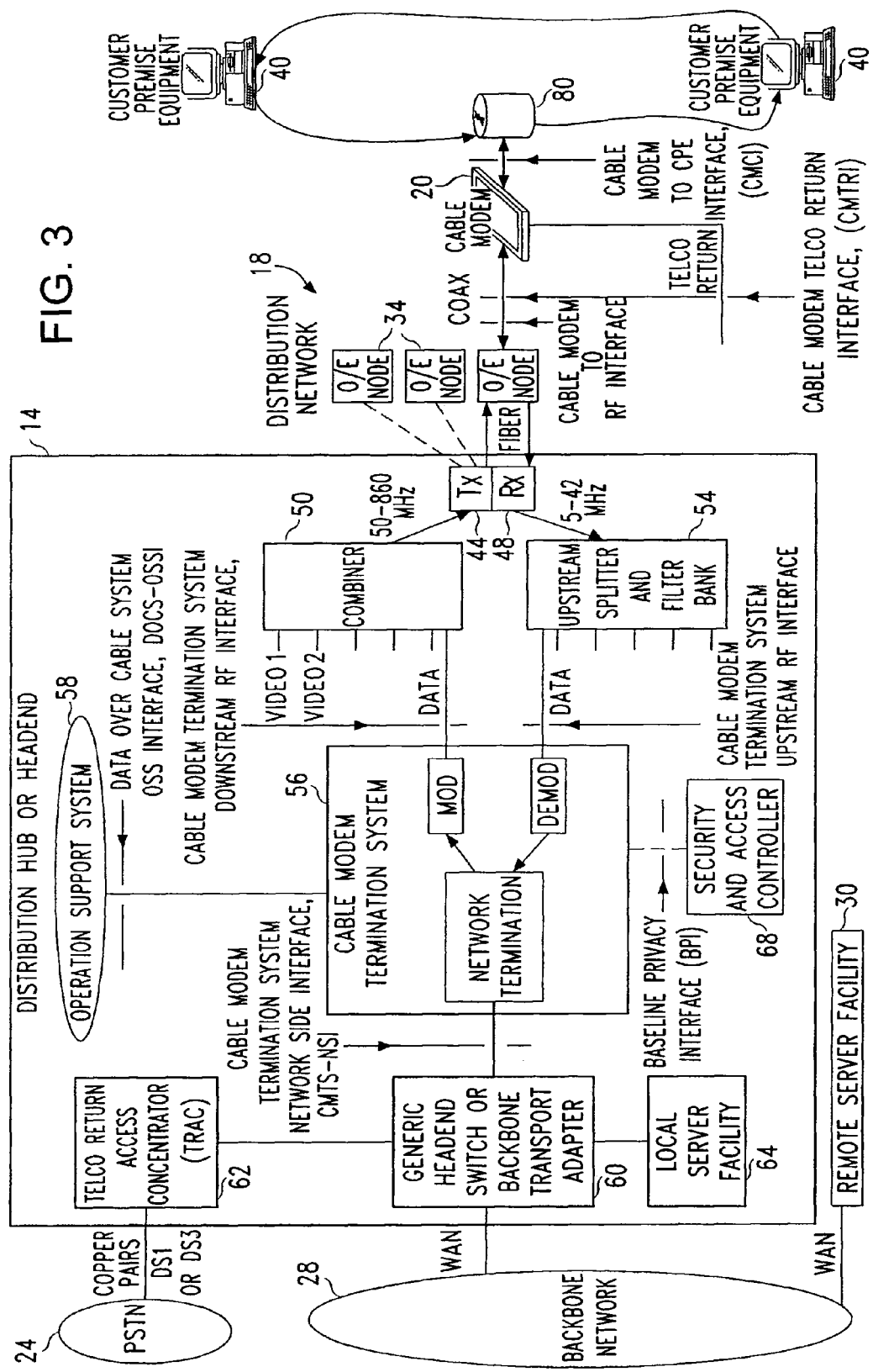
FIG. 3 is a diagram of the system shown in FIG. 1 where the CPE component is coupled to the cable modem through a router.

The DOCSIS specification assumes that each CPE component 40 coupled to distribution network 18 through a cable modem 20 is coupled through a separate NIC at a cable modem 20. However, many subscribers have more than one computer at a site and may desire to couple more than one computer at the site to distribution network 18 at the same time. In order to make contemporaneous operation of two computers through a cable modem 20 possible, each would require a separate connection to the cable modem. This may require a hub or physical proximity of the two or more computers to cable modem 20. In an effort to avoid such a constraint, some subscribers install a router, such as a wireless router, to couple all of the computers at their site together into a network. The router may then be coupled to the cable modem so all of the computers and other devices coupled together on the network are coupled through the router to the cable modem and the data-over-cable system supported by distribution network 18. Using like numerals for like components, a system depicting a group of CPE components 40 being coupled to cable modem 20 through a router 80 is shown in FIG. 3. The IP message traffic flow for the system depicted in FIG. 3 is shown in FIG. 4. Because the IP messages may flow from CPE component 40 to CMTS 56 for delivery to a remote server 30 and from remote server 30 to CMTS 56 for delivery to CPE component 40, router 80 and CPE component 40 must be assigned a routable IP address.

When router 80 is initialized after being coupled to cable modem 20, it is assigned a private IP address by a server of OSS 58 through CMTS 56. When one of the CPE components 40 coupled to router 80 activates a high speed data account through CMTS 56, router 80 must be assigned a routable IP address for communication over distribution network 18 and network 28. The agent software that manages the IP communication parameters for the CPE component initiating the communication does not know that it is coupled to network 18 through router 80. Also, the SAS server does not know the MAC address of the CPE component because the MAC address of the CPE component does not get past router 80 for delivery to the SAS server. Consequently, the SAS server treats the request as coming from router 80 and the routing and ARP tables at CMTS 56 and cable modem 20 correlate the private IP address to the MAC address of router 80. Messages received at router 80 for the CPE component are still passed through to the CPE component because router 80 recognizes the IP address from its internal routing table.

Figure 5:
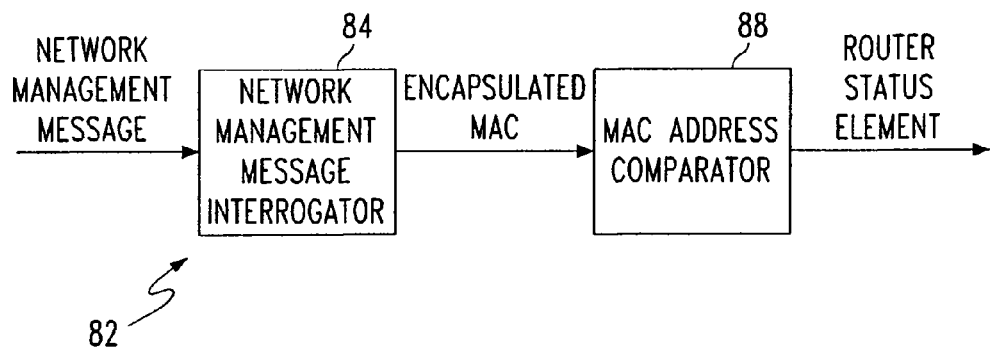
FIG. 5 is a block diagram of a system that detects the router in FIG. 3 from an encapsulated MAC address.

The components of a system 82 shown in FIG. 5 allow a head end server to communicate with a CPE agent in a way that reduces the likelihood that network management message responses cause an agent executing on a CPE component behind a router 80 to execute unnecessary processes. The components include a network management message interrogator 84 and a MAC address comparator 88. The network management message interrogator 84 parses network management messages that are communicated from devices on distribution network 18. Preferably, account query messages are used to implement the principles of the present invention, although other network management messages may be used to determine whether a CPE component is behind a router. These messages query the SAS server for account data, such as service level, billing information, and the like. Interrogator 84 parses a network management message, such as a Query Account Information XML message, to identify an encapsulated MAC address from the device that originated the message. Comparator 88 compares the encapsulated MAC address to the source MAC address of the device directly coupled to the cable modem that relayed the message from the CPE component. If the encapsulated field does not contain a MAC address that is the same as the source MAC address, then comparator 88 sets a router status element to an active state indicating that the message originated from a CPE component that is behind a router or other device interposed between the CPE component and the cable modem at the CPE component site. System 82 may be part of the SAS server or part of some other head end component that has access to network management messages, such as account messages or other messages that OSS 58 processes. The router status element permits the network management agent at the CPE component to detect that it is behind a router and to set a router present element at the CPE component so this topology factor may be included in the processing done by the network management agent software.

Figure 6:
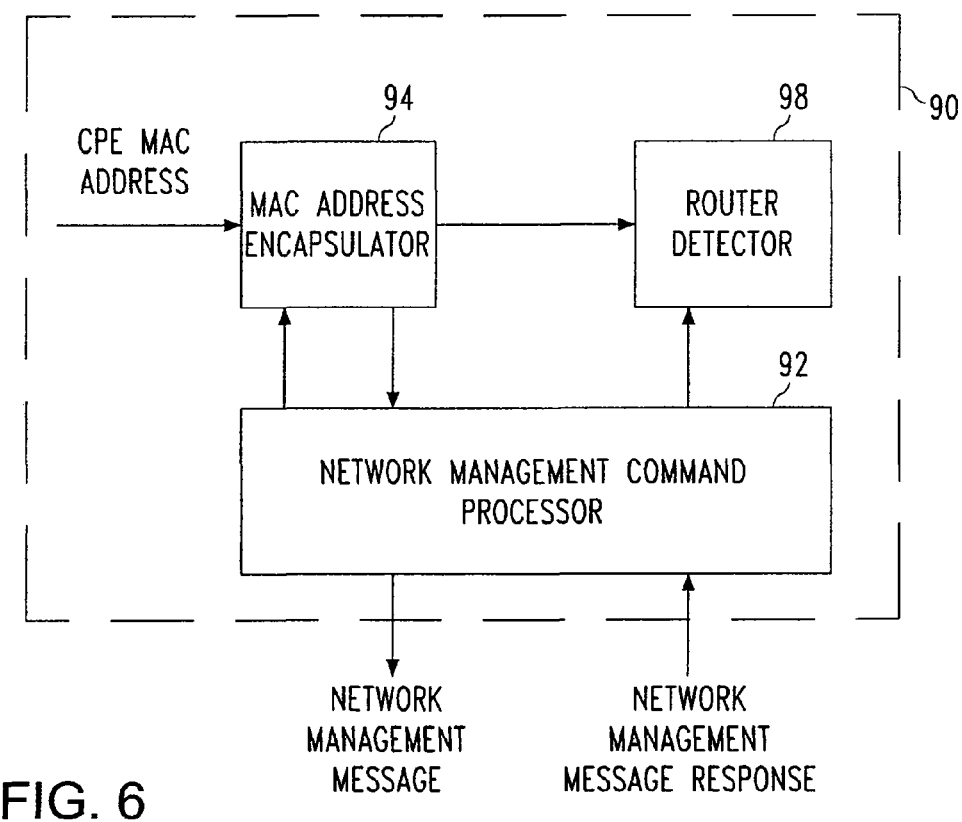
FIG. 6 is a block diagram of a system that executes in the CPE component of FIG. 3 and executes network management processes in accordance with the presence or absence of a router as shown in FIG. 3.

The components of a network management agent 90 that executes on a CPE component 40 to communicate with head end 14 and provide data so a head end server is able to determine whether CPE component 40 is behind a router are shown in FIG. 6. System 90 includes a network management processor 92, a MAC address encapsulator 94, and a router detector 98. Processor 92 performs typical processing of network management message responses. MAC address encapsulator 94 encapsulates within a network management message, such as the Query Account Information XML message, the MAC address of the CPE component on which the agent software is executing so processor 92 may complete the network management message for communication to head end 14. Router detector 98 parses a network management message response received by processor 92 to determine whether a router status element is included that indicates the CPE component on which the agent software is executing is behind a router. In response to the router status element indicating the CPE component is behind a router, router detector 98 sets a router status element at the CPE component to indicate the presence of a router between the CPE component and its cable modem. Processor 92 of the agent software parses and executes network management message responses received from CMTS 56 and examines the router status element to determine whether a router is between the CPE component and its cable modem. If the router status element is active, network management message responses may be ignored by the agent software if action at the router adequately accomplishes the purpose of the message responses.

For example, after activation of a high speed data account, the CPE agent may send a network management message requesting whether additional network device management is required. The SAS may send a response indicating that the cable modem needs to be reset. The agent software, in turn, displays a message requesting permission from the user to proceed with the resetting of the cable modem. As explained above, the message requesting permission is displayed because resetting the cable modem may adversely impact other services that may be provided through the cable modem to the subscriber site. In response to user acceptance of this request, the network management agent sends a cable modem reset request network management message to the SAS server. Periodically thereafter, the network management agent sends Query Account Information XML messages to determine when the cable modem rebooting is finished. Once the cable modem has rebooted, it performs a process to obtain a routable IP address and to be configured for routable IP communication. IP communication is not available, however, until the router has obtained a routable IP address. After the cable modem has rebooted and obtained its routable IP address, the agent software may encapsulate the CPE component MAC address in a network management message that is sent to the SAS server. Preferably, the Query Account Information XML message is the network management message that the agent uses to send its encapsulated MAC address to the SAS server. These messages also contain the MAC addresses of the cable modem and the router in accordance with the DOCSIS protocol. The cable modem MAC address is known to the SAS server from the process by which the cable modem obtained its routable IP address. By comparing the encapsulated MAC address to the source MAC address, which in the case of a router coupled between a CPE component and a cable modem is the router MAC address, the SAS server may determine that the device originating the network management message is not directly coupled to the cable modem. Thus, the SAS server may now set a data element in a network management message response to inform the network management agent that it is executing on a CPE component behind a router. This network management message response informs the agent software that it is executing on a device behind a router so the agent may determine that the router, not the CPE component, requires device management to obtain a routable IP address. In response, the agent software may display a message to the user directing the user to reset the router so it may obtain a routable IP address. In this manner, the agent software on CPE component 40 may evaluate a network management message response in light of its position behind a router.

Preferably, the network management message encapsulating the MAC address of the CPE component is a Query Account Information XML message with a format as shown in FIG. 7A. The header 130 identifies the source of the message, which in this example is ATT agent software, along with a timestamp, version number, and operating system identifier. The body of the message includes delimiters in which the MAC address 132 is provided. An exemplary network management response to the message of FIG. 7A is shown in FIG. 7B. Header 134 identifies the source, which in the example is the SAS server, as well as a timestamp and version number. In the body of the message, a data element cpe_behind_router_status 136 is included with its value set to the integer 1, which indicates the CPE component is behind a router. This is the router status element that is set in response to the encapsulated MAC address not being the same as the MAC address of the device coupled to the cable modem that sent the message.

Figure 8:
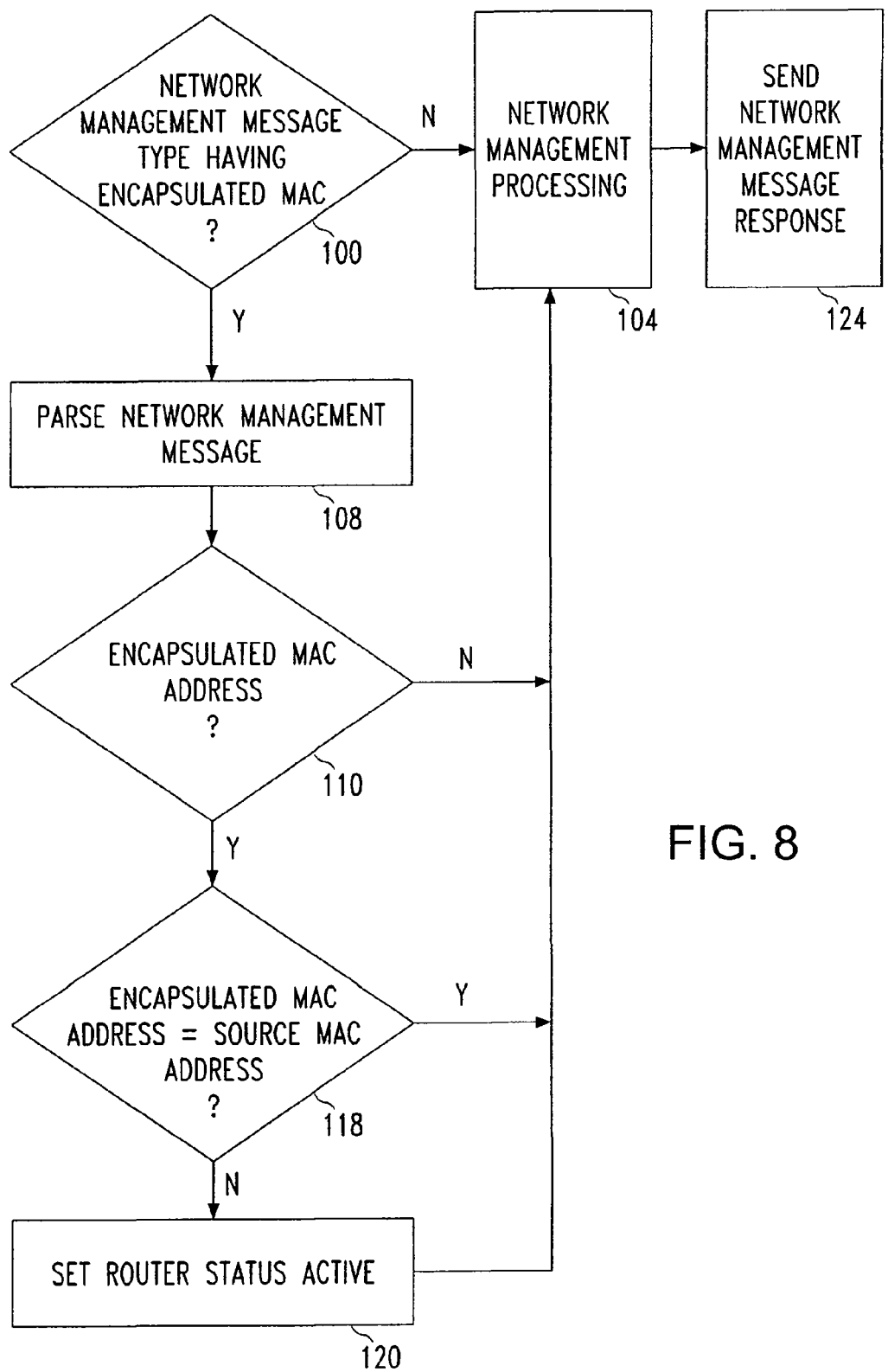
FIG. 8 is a flow diagram of the process that is implemented by the system of FIG. 5.

An exemplary method that may be used with system 82 of the present invention is shown in FIG. 8. The method begins by determining that a type of network management message having an encapsulated MAC address, such as a Query Account Information XML message, has been received (block 100). If the message is not a message that has been designated for MAC address encapsulation, other network management message processing is performed (block 104). Otherwise, the network management message that may contain an encapsulated MAC address is parsed (block 108) and the process determines whether an encapsulated MAC address is present (block 110). If one is not present, then typical network management message processing is performed (block 104). Otherwise, the encapsulated MAC address is compared to the source MAC address, which is the address of the device coupled to the cable modem that relayed the message from CPE component 40 (block 118). If the two MAC addresses are the same, typical network management message processing continues (block 104). Otherwise, a router status element is set to an active state that indicates that the message originated from a CPE component that is behind a router or other device interposed between the CPE component and the cable modem at the CPE component site (block 120). The remainder of the message may then be processed (block 104) if it was not processed before the encapsulated MAC address was interrogated. After message processing, the router status element is included in the response message that is sent to the router for delivery to the CPE component (block 124). Thus, the response message is sent to router 80 with an IP address for CPE component 40 and a MAC address for router 80. Router 80 then forwards the response message with the IP address of the CPE component in correspondence with its internal routing tables.

Figure 9:
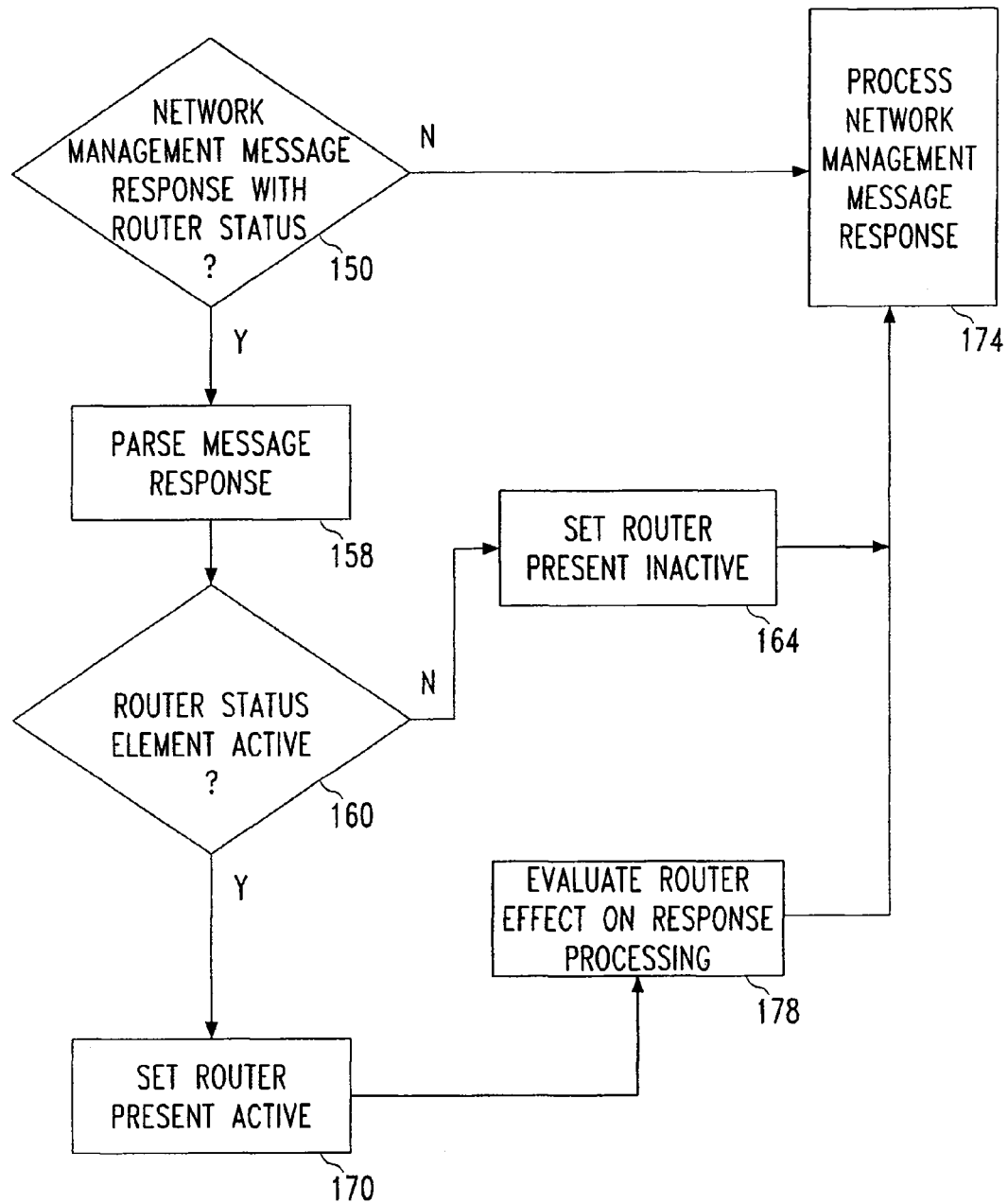
FIG. 9 is a flow diagram of the process that is implemented by the system of FIG. 6.

An exemplary process that may be performed by system 90 is shown in FIG. 9. The process begins by determining whether a network management message response having a router status element has been received (block 150). If one has not been received, typical network management message response processing is performed (block 174). If the network management message response has a router status element, it is parsed (block 158) to determine whether the router status element indicates a router is between the device and its cable modem (block 160). If the router status element indicates no router is present, then the router present element is set to an inactive state (block 164) and typical network management message response processing continues (block 174). If the element indicates a router is present, then a router present element is set to indicate the presence of a router (block 170). The effect of the router presence on typical network management message response processing may now be evaluated (block 178). The evaluation may include the setting of data elements to alter processing of network management message responses. For example, the router present element being active may result in the setting of a display router reset message data element.

In operation, the network management agent at a CPE component is modified to include a MAC encapsulator 94 and a router detector 98. Likewise, appropriate components at head end 14, such as a SAS server of OSS 58, are modified to include a network management message interrogator 84 and an encapsulated MAC address comparator 88. Thereafter, OSS 58 operates to parse the type of network management messages that may contain encapsulated MAC addresses to detect the presence of a router from a difference between an encapsulated MAC address and a source MAC address in a network management message. A response message containing a router status element is returned to inform the CPE component so it may set a router present element for use with its network management agent software. The network management agent software also encapsulates its own MAC address in the network management messages that it originates and parses network management message responses to determine whether it is behind a router. Thereafter, the network management agent software may determine whether network management message responses sent to its IP address require action at the router or CPE component in which it is executing. In this manner, unnecessary network management process execution is reduced.

While the present invention has been illustrated by the description of exemplary processes and system components, and while the various processes and components have been described in considerable detail, applicant does not intend to restrict or in any way limit the scope of the appended claims to such detail. Additional advantages and modifications will also readily appear to those skilled in the art. For example, while the invention has been described with reference to particular messages and head end components, other types of messages and head end components may be used. Also, while the invention has been discussed with reference to a router being coupled between a CPE component and a cable modem, another type of intervening device may be coupled between the CPE component and the cable modem. The system and method of the present invention may be used to detect such other types of intervening devices. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for determining that a router is coupled between a piece of customer premise equipment and a cable modem, comprising:
   a hardware processor executing a network management agent executing on a customer premise equipment component that encapsulates an address of the customer premise equipment component in a network management message, the network management agent further comprising:
      an address encapsulator for encapsulating the address of the customer premise equipment component in the network management message; and
      a router detector for determining whether a router status element in a network management message response indicates that the router is coupled between the customer premise equipment component and the cable modem through which the customer premise equipment component communicates; and
   a head end server that compares the address of the customer premise equipment component to a source address so that the head end server detects the router being coupled between the customer premise equipment component and the cable modem through which the customer premise equipment component communicates.

2. The system of claim 1, wherein the address encapsulator encapsulates the address in the network management message that is processed by the head end server, wherein the head end server is a service activation server.

3. The system of claim 2, wherein the address encapsulator encapsulates the address in a query account information extended markup language message.

4. The system of claim 1, wherein the network management agent processes a network management message response in accordance with a state of the router status element.

5. A system for determining that a router is coupled between a piece of customer premise equipment and a cable modem, comprising:
   a hardware processor executing a network management agent executing on a customer premise equipment component that encapsulates an address of the customer premise equipment component in a network management message; and
   a head end server that compares the address to a source address so that the head end server detects the router being coupled between the customer premise equipment component and the cable modem through which the customer premise equipment component communicates, wherein the head end server is a service activation server, the service activation server including:
- a network management message interrogator for parsing a type of network management messages to obtain the address that is encapsulated; and
- an address comparator for comparing the address to the source address of a device coupled to the cable modem that sent the network management message to determine whether the router is the device that is coupled between the customer premise equipment component and the cable modem corresponding to the source address.

6. The system of claim 5, wherein the network management message is a query account information extended markup language message.

7. A method for determining that a router is coupled between a piece of customer premise equipment and a cable modem, comprising:
- encapsulating an address for a customer premise equipment component in a network management message;
- comparing the address to a source address so that the router coupled between the customer premise equipment component and the cable modem through which the customer premise equipment component communicates is detected; and
- determining whether a router status element in a network management message response indicates that the router is coupled between the customer premise equipment component and the cable modem through which the customer premise equipment component communicates.

8. The method of claim 7, wherein the encapsulating is done in the network management message that is processed by a head end server, wherein the head end server is a service activation server.

9. The method of claim 8, wherein the encapsulating is done in a query account information extended markup language message.

10. The method of claim 7, further comprising:
- processing a network management message response in accordance with a state of the router status element.

11. A method for determining that a router is coupled between a piece of customer premise equipment and a cable modem, comprising:
- encapsulating an address for a customer premise equipment component in a network management message;
- comparing the address to a source address so that the router coupled between the customer premise equipment component and the cable modem through which the customer premise equipment component communicates is detected; and
- parsing the network management message to obtain the address that is encapsulated, wherein the comparing includes comparing the address that is encapsulated to the source address of a device coupled to the cable modem that sent the network management message to determine whether the router is the device that is coupled between the customer premise equipment component and the cable modem corresponding to the source address.

12. The method of claim 11, wherein the network management message comprises a query account information extended markup language message.

13. A customer premise equipment component comprising a network management agent executing on a hardware processor of the customer premise equipment component comprising:
- said hardware processor executing an address encapsulator for encapsulating in a network management message an address of the customer premise equipment component on which the network management agent is executing; and
- a router detector for determining whether a router status element in a network management message response indicates that a router is coupled between the customer premise equipment component and a cable modem through which the customer premise equipment component communicates.

14. The customer premise equipment component of claim 13, wherein the address encapsulator encapsulates the address in the network management message that is processed by a head end server, wherein the head end server is a service activation server.

15. The customer premise equipment component of claim 14, wherein the network management message comprises a query account information extended markup language message.

16. The customer premise equipment component of claim 13, further comprising:
- a network management command processor that processes a network management message response in accordance with a state of the router status element.

* * * * *